United States Patent [19]

Weber

[11] Patent Number: 4,541,998
[45] Date of Patent: Sep. 17, 1985

[54] THIOCYANATE TO PREVENT THE FORMATION OF THIOSULFATE IN THE OXIDATION OF HYDROGEN SULFIDE

[75] Inventor: Günter Weber, Linden, Fed. Rep. of Germany

[73] Assignee: Linde Aktiengesellschaft, Wiesbaden, Fed. Rep. of Germany

[21] Appl. No.: 569,097

[22] Filed: Oct. 12, 1983

Related U.S. Application Data

[63] Continuation-in-part of Ser. No. 406,805, Aug. 10, 1982, abandoned.

[30] Foreign Application Priority Data

May 26, 1982 [DE] Fed. Rep. of Germany ....... 3219762

[51] Int. Cl.$^4$ ..................... B01D 53/34; C01B 17/04
[52] U.S. Cl. .................................. 423/226; 423/573 R
[58] Field of Search ................... 423/224, 226, 573 C, 423/573 R

[56] References Cited

U.S. PATENT DOCUMENTS 3,972,989  8/1976  Fenton et al. ................. 423/226 X
4,017,594  4/1977  Fenton et al. .................. 423/573 R
4,325,936  4/1982  Gowdy et al. .................. 423/573 R

FOREIGN PATENT DOCUMENTS 1488659 10/1977 United Kingdom ........... 423/573 R

OTHER PUBLICATIONS

Kohl et al., "Gas Purification", 3rd Ed., *Gulf Publishing Co.*, Houston, pp. 476–487.

*Primary Examiner*—Earl C. Thomas
*Attorney, Agent, or Firm*—Millen & White

[57] ABSTRACT

A process is described for preventing the formation of thiosulfate in oxidative hydrogen sulfide scrubbings. For this purpose, an aqueous alkaline scrubbing agent, containing an oxidizing agent, is used, the hydrogen sulfide being absorbed from the scrubbing agent in a scrubbing column and oxidized principally to elementary sulfur with reduction of the oxidizing agent. Subsequently, the scrubbing agent is regenerated for reuse by exposure to an oxygen-containing gas for the reoxidation of the oxidizing agent. A thiocyanate is added to the scrubbing agent, advantageously in a concentration of 0.06 to 0.5 mol/l, preferably 0.3 to 0.4 mol/l.

13 Claims, No Drawings

THIOCYANATE TO PREVENT THE FORMATION OF THIOSULFATE IN THE OXIDATION OF HYDROGEN SULFIDE

CROSS-REFERENCE TO RELATED APPLICATION

This application is a continuation-in-part of application Ser. No. 406,805, filed Aug. 10, 1982, now abandoned.

BACKGROUND OF THE INVENTION

This invention relates to the simultaneous scrubbing and oxidation of hydrogen sulfide, and in particular to the prevention of the formation of thiosulfate during such a process. In such processes, an aqueous alkaline scrubbing agent containing an oxidizing agent is employed, and the hydrogen sulfide is absorbed from the scrubbing agent in a scrubbing column and oxidized principally to elementary sulfur with reduction of the oxidizing agent. The scrubbing agent generally is subsequently regenerated for reuse by treatment with an oxygen-containing gas for reoxidation of the oxidizing agent.

In known processes of this type, the gas to be cleaned of hydrogen sulfide is scrubbed with an aqueous alkaline solution, such as a sodium carbonate solution having a pH between 8 and 9, which contains a soluble salt, such as the sodium salt of anthraquinonedisulfonic acid, and a metal vanadate, the vanadium being present in the five-valent oxidation state (for example British Patent Specification No. 1,488,659). The absorbed hydrogen sulfide dissociates in the solution with formation of $HS^-$ ions which reduce the vanadium to the four-valent oxidation state, elementary sulfur being liberated. The reduced vanadium can be reoxidized by an oxidation reaction with an oxygen-containing gas in the presence of anthraquinonedisulfonic acid.

It has been found, however, that part of the hydrogen sulfide is oxidized to soluble sodium sulfate and sodium thiosulfate which build up in the scrubbing solution over time and must be removed. Whereas the removal of sodium sulfate can be accomplished, for example, by simple crystallization, this is not possible for sodium thiosulfate because of its high solubility. Furthermore, since sodium thiosulfate is a substance which is ecologically deleterious because of its high biological oxygen demand, the scrubbing solution cannot simply be discarded.

In this context, it has already been proposed (German Patent Specification No. P 32 16 160.3), to shift the ratio of formation of sulfate to thiosulfate ions in favor of the sulfate ions by decreasing the pH in the scrubbing solution, and thus to suppress the formation of thiosulfate.

SUMMARY OF THE INVENTION

An object of the present invention is to provide an additional process which results in the prevention of the formation of thiosulfate in a simple and cost-effective manner.

Upon further study of the specification and appended claims, further objects and advantages of this invention will become apparent to those skilled in the art.

These objects are achieved according to the invention by adding to the scrubbing agent a source of thiocyanate, said source being thiocyanate or a compound capable of forming a thiocyanate.

For this purpose, it is particularly advantageous to use the source of thiocyanate in a concentration of 0.06 to 0.5 mol/l, preferably 0.2 to 0.4 mol/l, said mols being of thiocyanate ion.

The invention depends on the surprising recognition that the formation of thiosulfate in the simultaneous scrubbing and oxidation of hydrogen sulfide is suppressed by the addition of thiocyanate, such as, for example, sodium, potassium or ammonium thiocyanate, or by compounds capable of forming thiocyanates, such as, for example, cyanides. Thus, the problem of the buildup of ecologically deleterious thiosulfate in the scrubbing agent is prevented according to the invention in a simple manner. The thiocyanates will stay in solution without any reaction occurring, thereby merely circulating in the cycle.

In addition to finding utilization in the Stretford process, the present invention is also broadly useful in any absorption process where vanadium is used as an oxidizing agent, e.g., in other processes where an amine is employed as a promoter, e.g., an alkanolamine such as, e.g., methyldiethanolamine (MDEA).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A definite volume of scrubbing solution was loaded and oxidized (regenerated) consecutively in 16 cycles. In the first experiment the scrubbing solution contained, as the oxidizing agent, 1.5 g/l vanadium, 3 g/l of anthraquinonedisulfonic acid and, in addition, 20 g/l of sodium carbonate. In the second experiment an additional 30 g (corresponding to 0.37 mol) of sodium thiocyanate were added to the scrubbing agent per liter of scrubbing agent.

In the first experiment a total of 2.1 g of sodium thiosulfate per liter of scrubbing agent, or 0.13 g of thiosulfate per liter cycle, were found. In contrast, in the second experiment, with thiocyanate added, no detectable formation of thiosulfate was found.

This result was confirmed by a simultaneous absorption and oxidation of hydrogen sulfide conducted at a pH of 8.5 in a recycling apparatus which corresponds in its basic construction to an industrial plant. In this experiment no measurable formation of thiosulfate could be found after more than 1,000 hours of operation.

EXAMPLE 2

An oxidative wet-scrubbing $H_2O$ absorption is conducted with an amine as the promoter. The scrubbing liquid used is of the following composition:

| | |
|---|---|
| $Na_2CO_3$ | 20 g/l |
| V | 1.5 g/l |
| MDEA | 50 g/l. |

The gas to be treated contains 98 Vol% $CO_2$ and 2 Vol% $H_2S$. After absorption, the scrubbing liquid had a pH of about 7.6. The residence time of the scrubbing liquid in the oxidizing media is about 22 minutes. After the first 275 hours of operation without any NaSCN being added, the concentration of $Na_2S_2O_3$ increased to 0.57 g per liter per day.

Thereafter, 20 g/l NaSCN were added to the scrubbing liquid, while the other conditions remained constant. After the addition of NaSCN no further $Na_2S_2O_3$ was formed, the concentration of $Na_2S_2O_3$ actually decreasing 0.35 g/liter/day after 500 hours of operation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a continuous process comprising oxidizing hydrogen sulfide absorbed in an aqueous alkaline scrubbing agent having a pH of 8–9 and prepared by admixing in water a vanadate oxidizing agent, anthraquinonedisulfonic acid and sodium carbonate, the weight proportion of the vanadium to the anthraquinonedisulfonic acid being about 1:2, the hydrogen sulfide being thereby oxidized principally to elementary sulfur; regenerating the scrubbing agent in an oxidizer to reoxidize reduced vanadate with an oxygen containing gas; and recycling the resultant scrubbing agent to the scrubbing step, said process being susceptible to the formation of thiosulfate, the improvement consisting essentially of providing a sufficient concentration of a source of thiocyanate in the scrubbing agent to prevent any build-up of thiosulfate after at least 1,000 hours of operation, which build-up would otherwise occur in the absence of the addition of said source of thiocyanate.

2. A process according to claim 1, wherein the source of thiocyanate is added in a concentration of 0.06 to 0.5 mol thiocyanate per liter.

3. A process according to claim 1, wherein the source of thiocyanate is added in a concentration of 0.2 to 0.4 mol thiocyanate per liter.

4. A process according to claim 1, wherein said aqueous alkaline scrubbing agent consists essentially of 1.5 g/liter of vanadium, 3 g/liter of anthraquinonedisulfonic acid in salt form, and 30 g/liter of sodium thiocyanate.

5. In a continuous process comprising oxidizing hydrogen sulfide absorbed in an aqueous alkaline scrubbing agent containing a vanadate oxidizing agent and a promoter consisting essentially of an amine, the hydrogen sulfide being thereby oxidized principally to elemental sulfur; regenerating the scrubbing agent in an oxidizer to reoxidize reduced vanadate with an oxygen containing gas; and recycling the resultant regenerated scrubbing agent to the scrubbing step, said process being susceptible to the formation of thiosulfate, the improvement comprising providing a sufficient concentration of a source of thiocyanate in the scrubbing agent to prevent any build-up of thiosulfate after at least 500 hours of operation.

6. A process according to claim 5, wherein said aqueous alkaline scrubbing agent consists essentially of the vanadate, the amine, and the source of thiocyanate.

7. A process according to claim 6, wherein said aqueous alkaline scrubbing agent contains sodium carbonate.

8. A process according to claim 6, wherein said amine is an alkanol amine.

9. A process according to claim 8, wherein said alkanol amine is methyldiethanolamine.

10. A process according to claim 7, wherein said amine is an alkanol amine.

11. A process according to claim 10, wherein said alkanol amine is methyldiethanolamine.

12. A process according to claim 5, wherein said amine is an alkanol amine.

13. A process according to claim 5, wherein said alkanol amine is methyldiethanolamine.

* * * * *